United States Patent [19]

Overall

[11] 4,042,200
[45] Aug. 16, 1977

[54] UNIVERSAL MOUNT FOR SPLICING TOOL

[75] Inventor: Bob Eugene Overall, Santa Barbara, Calif.

[73] Assignee: Margaret Mae Cooke, Santa Barbara, Calif.

[21] Appl. No.: 683,710

[22] Filed: May 6, 1976

[51] Int. Cl.² .......................................... A47B 96/06
[52] U.S. Cl. .................. 248/223.1; 248/229; 248/230; 248/214
[58] Field of Search .................. 248/226 R, 224, 229, 248/230, 200, 205 R, 309 R, 222.4, 223.1, 225.3; 269/46, 321 W, 321 WE

[56] References Cited

U.S. PATENT DOCUMENTS

| 254,333 | 2/1882 | Kane | 248/224 |
|---|---|---|---|
| 2,708,088 | 5/1955 | Steinke | 248/224 |
| 2,879,962 | 3/1959 | Biskup | 248/226 R |
| 3,233,853 | 2/1966 | Majewski | 248/226 R |
| 3,739,920 | 6/1973 | Coblentz | 248/214 |
| 3,779,499 | 12/1973 | Shell | 248/224 |
| 3,850,399 | 11/1974 | McClymont | 248/229 |
| 3,856,232 | 12/1974 | Rinaldi | 248/226 R |

FOREIGN PATENT DOCUMENTS 519,196  12/1955  Canada ........................... 248/226 R Primary Examiner—Marion Parsons, Jr.

[57] ABSTRACT

A device for maintaining a splicing bar in a substantially horizontally aligned plane in which said splicing bar supports a splicing tool and holder. The device comprises a mount for attaching the splicing bar to a vertical structure including attachment means for securing the mount to a variety of vertical structures by means of a standard keyhole slot engagement. The mount includes clamping means for fixedly securing said horizontally aligned splicing bar and stabilizing means for maintaining the mount in a substantially vertical plane. For use in certain applications, an adapter is employed which provides the necessary keyhole slots when not otherwise available.

11 Claims, 9 Drawing Figures

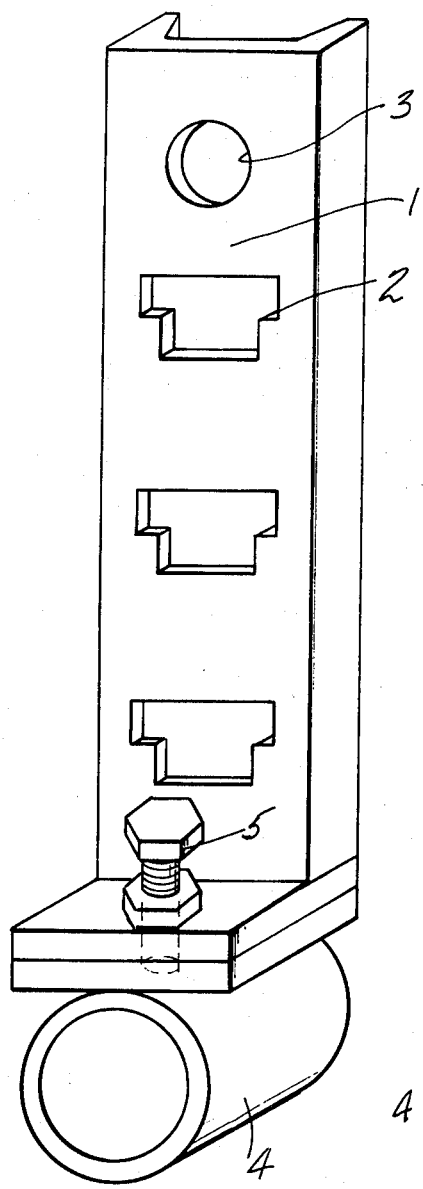
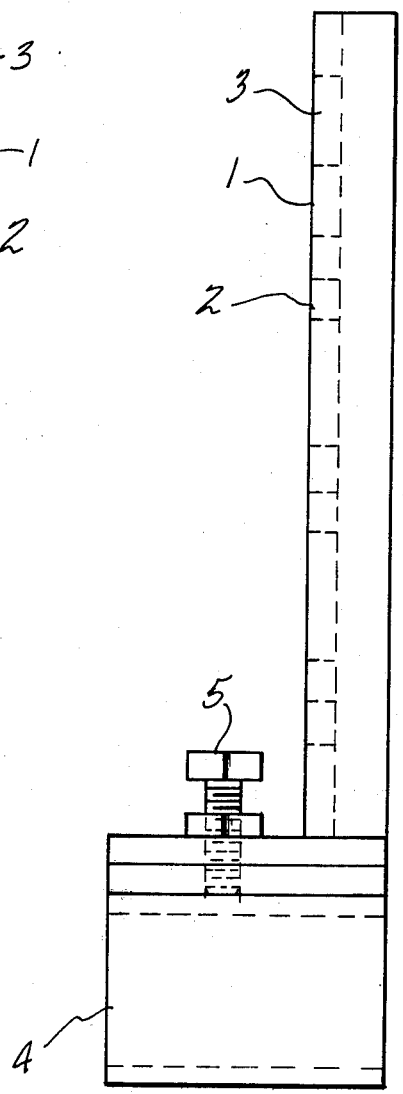
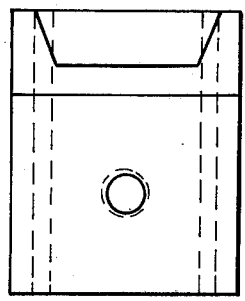
FIG-1A
FIG-1B
FIG-1C

UNIVERSAL MOUNT FOR SPLICING TOOL

In the telephone industry, the conductors used for individual telephone circuits are provided as twisted pairs of conductors; that is to say, two insulated wires helically intertwined along their lengths. These wires serve as signal conductors for an individual telephone circuit. Telephone cables may contain large numbers of twisted pairs of insulated conductors; for example, one of the larger sizes of cables currently being used contains 2,700 pairs of conductors or 5,400 individual conductors.

It is frequently necessary to splice the end of a telephone cable containing several hundred or several thousand twisted pairs of conductors to the end of another cable. When a new telephone cable is being installed, the cable is provided in lengths of several hundred feet so that every several hundred feet along the length of the cable, a splice must be made. It is also necessary to make splices between cable ends if the cable is accidentally severed or it is broken as a result of a natural phenomenon such as a hurricane or an earthquake.

The splicing of telephone cables is essentially a manual operation and must be carried out in the field; that is, in a manhole, trench or on a suspended aerial cable. Telephone cable splicing operations are time consuming, tedious, and expensive because of the large number of splices which must be made and because of the large numbers of pairs of conductors in an individual cable.

The individual wires which comprise the telephone cable are generally composed of copper and are of a diameter of approximately 0.020 inches. The connecting of these wires is referred to as cable splicing. Presently, several different tools are required to splice cables, the tool employed being a function of the physical environment in which the splicing operation is performed.

The vast majority of splicing operations which are performd are in aerial locations, in or over trenches and in manholes. Although the splice which is ultimately completed is essentially identical in all of these instances, the apparatus, both the splicing tool per se as well as the mounting means therefor, are varied. This requires that one who is performing the splicing operation carry with him a diversity of devices, each adapted for the particular location. The desirability of a single mounting means suitable for carrying out the above splicing operations is self-evident.

Accordingly, it is an object of the invention to provide an improved splicing device for electrically connecting pairs of conductors to each other.

A further object of the invention is to provide a universal mounting means for a splicing connecting device adaptable for splicing pairs of conductors to each other in aerial locations, trenches and manholes.

A still further object is to provide a mounting means for a splicing connecting device which eliminates the necessity of purchasing a variety of different tools.

It is yet another object of the invention to provide a mounting means for a splicing connecting device which reduces labor costs by shortening set-up time due to the simplicity of the device of the present invention.

In the drawings:

FIG. 1A is a perspective view of the adapter of the present invention;

FIG. 1B is a side view, partly in phantom, of the adapter shown in FIG. 1A;

FIG. 1C is a top view, partly in phantom, of the same adapter shown in FIGS. 1A and 1B;

Figure 2A:
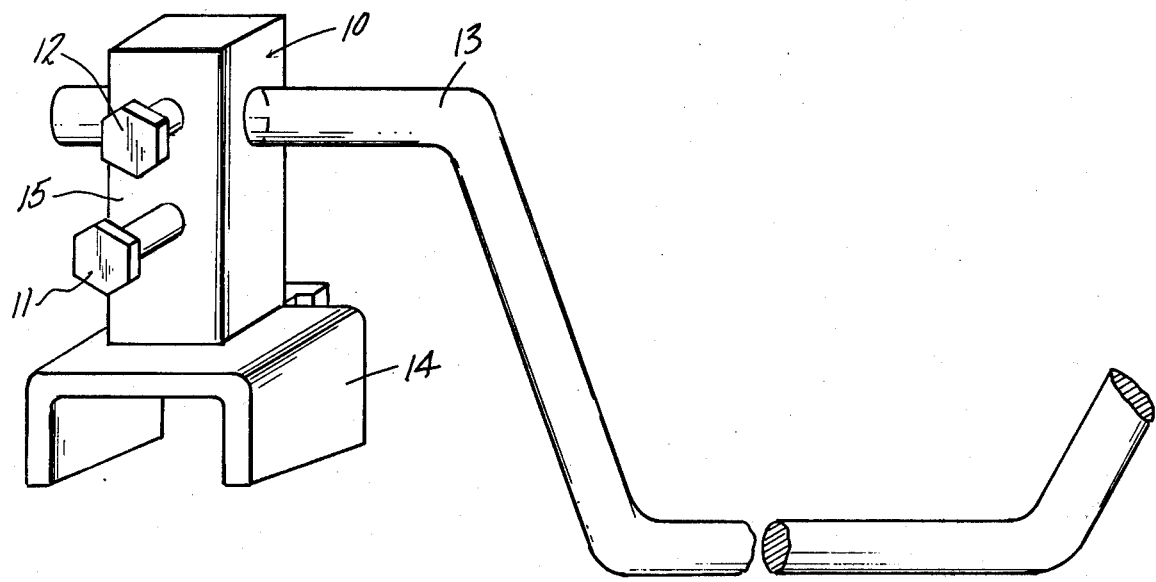
FIG. 2A is a perspective view of the mount of the present invention including a splicing bar.

The embodiment of FIG. 1 comprises the adapter which is capable of connecting the mount of FIG. 2 and splicing bar also of FIG. 2 to various structural members. More specifically, FIG. 1A depicts adapter 1 in perspective possessing keyhole slot 2, hole 3, clamping means 4, and adjustment bolt 5.

Generally, the adapter shown in FIG. 1 is primarily U-shaped, although the specific configuration is not critical. The adapter can be composed of a number of possible materials, including iron, steel, aluminum, etc. The only requirement in this regard is that the adapter possess the necessary structural rigidity and strength to successfully support the mount.

The adapter, as its name implies, adapts the mount to a variety of locations. For example, hole 3 can contain a bolt and plate or nut for attachment of the adapter to a UNISTRUT member (see FIG. 5, element 67) commonly seen in manhole and vault environments. Furthermore, claim ring 4, together with adjustment bolt 5, can rigidly secure the adapter to a horizontally aligned trench spreader (see FIG. 3).

Figure 2B:
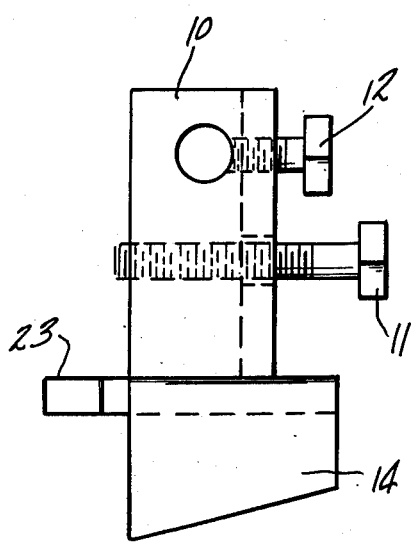
FIG. 2B is a side view, partly in phantom, of the mount shown in FIG. 2A.
Figure 2C:
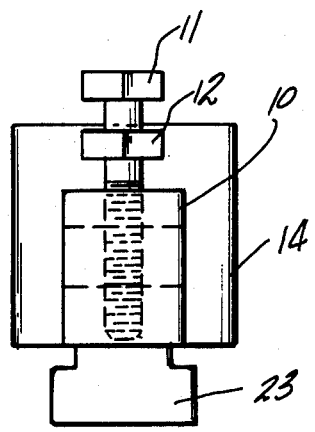
FIG. 2C is a top view, partly in phantom, of the same mount shown in FIGS. 2A and 2B.

The embodiment of FIGS. 2A-2C comprise mount 10 which is made up of vertical member 15, clamping means 12 for fixedly attaching splicing bar 13, stabilizing means 11 for maintaining the mount in a substantially vertical plane, and a rearwardly facing protruding key 23 for securing the mount to a complementary keyhole slot in the adapter. The mount further possesses extension member 14 which constitutes the lower extremity of the mount in order to provide stability.

Figure 3:
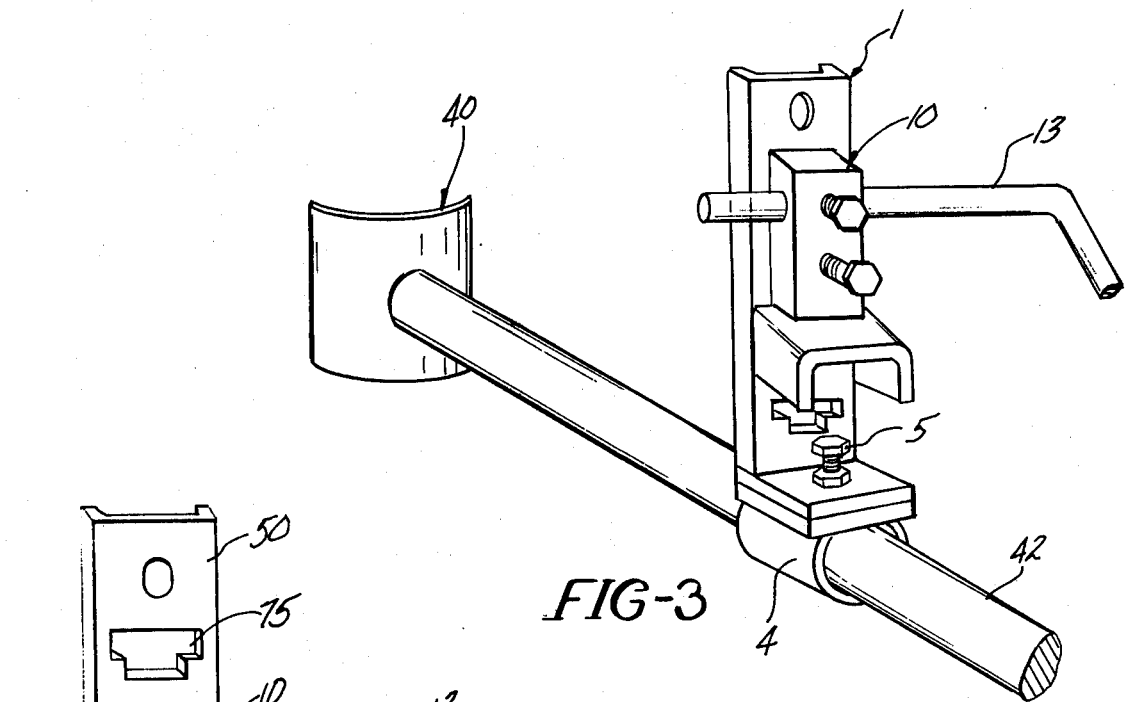
FIG. 3 is a perspective view of the present invention for use in trench spreading applications.

FIG. 3 depicts trench spreader 40 adaptable to frictionally engage the side of a trench (not shown). In this embodiment, ring clamp 4 securedly engages trench spreader 40 through bolt 5, thus maintaining adapter 1 in a vertical plane. Mount 10 attaches to adapter 1 as described previously by means of key 23 (see FIG. 2C) and keyhole slot 2 (see FIG. 1A).

Figure 4:
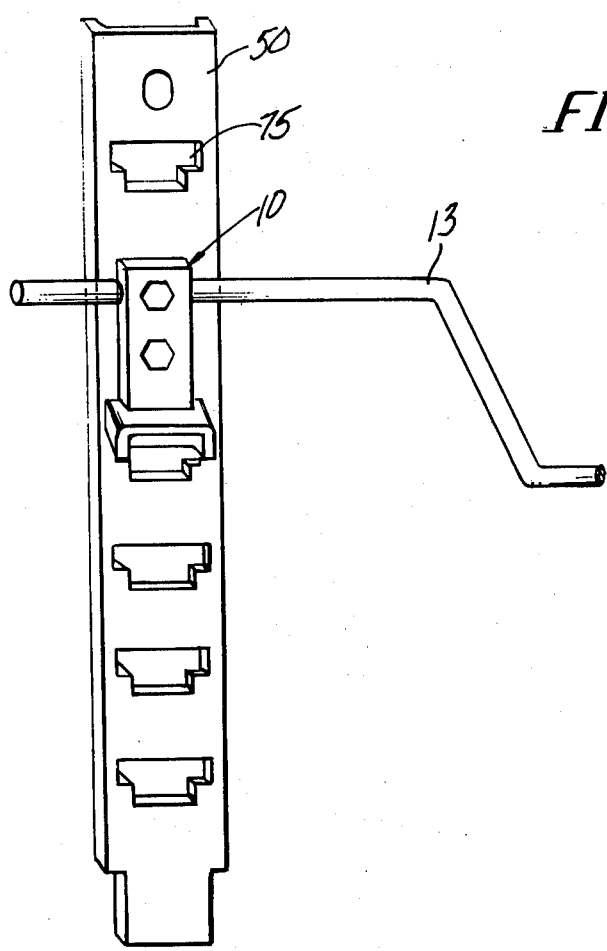
FIG. 4 is a perspective view of the present invention for use on a standard manhole rack.

As can be seen by viewing FIG. 4, standard manhole rack 50 usually possesses keyhole slot 75. Thus, mount 10 can be attached directly to manhole rack 50 without the need of an adapter.

FIG. 5 shows, again the use of adapter 1 for attachment of mount 10 to standard UNISTRUT 45. This is accomplished by passing bolt 67 through orifice 3 (see FIG. 1A). Bolt 67 engages a plate means (not shown) which tensionally engages the lips of UNISTRUT 45. As in the other embodiments, mount 10 engages adapter 1 by means of protruding key 23 (FIG. 2C) and complementary keyhole slot 2 (FIG. 1A). Whether or not adapter 1 is employed,, lower bolt 11 can be adjusted in order to help in maintaining stability of mount 10.

Figure 5:
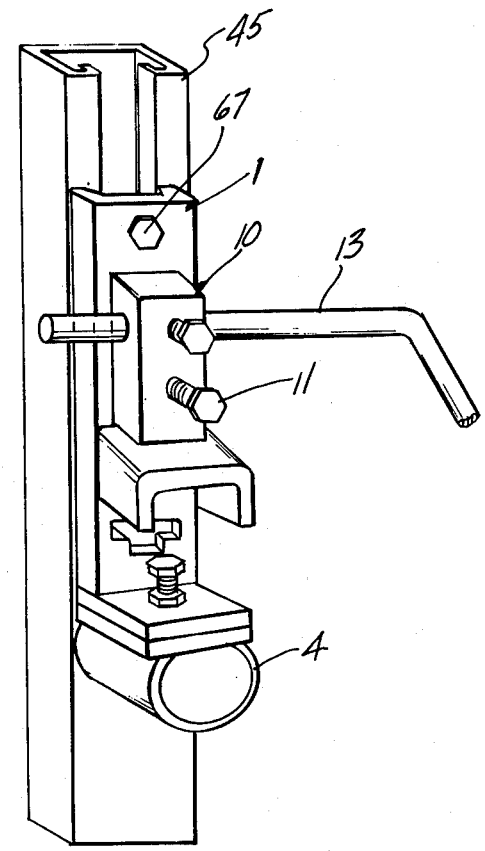
FIG. 5 is a perspective view of the present invention for use with a standard UNISTRUT.

Whether the present invention is employed as shown in either FIGS. 3, 4 or 5, bar 13 is used in order to support a standard splicing means (not shown). In any one of these applications, bar 13 must be supported at or near both extremities. Therefore, FIGS. 3, 4 and 5 show only one-half of the total hardware necessary to support bar 13.

Generally speaking, mount 10 functions to rigidly support splicing bar 13 which in turn supports the splicing tool (not shown). As shown, the mount is intended to connect splicing bar 13 to a vertically extending keyhole slot-containing member. Many times, structures such as standard manhole racks possess keyhole slots to which the mount of the present invention can be attached through member 23. However, in those locations in which certain vertical members fail to possess the necessary keyhole slots or, for that matter, fail to possess any vertical members whatsoever (e.g., trench spreading applications), the mount is intended to advantageously attach to the above-mentioned adapter.

Like the adapter, the mount can be produced from any known material possessing the necessary structural strength.

As can be seen, the mount and adapter are capable of supporting a splicing bar in a substantially horizontal plane on a number of vertical and horizontal members. During trench applications, the adapter-mount combinations can be attached to two substantially horizontal trench spreaders by means of clamp ring 4 (FIG. 1A) and support splicing bar 13 near each extremity thereof. Similarly, the mount, through securing bolt 12, can support the extremities of splicing bar 13 to vertical members such as standard unistrut and standard manhole racks. Thus, the present invention teaches a device capable of securing a splicing bar, to which is attached a holder for a splicing tool, in a substantially horizontally aligned plane to horizontal trench spreaders, vertical manhole racks and vertical standard UNISTRUT. These support structures represent the vast majority of currently available supporting means in the vicinity of commmonly practiced splicing operations. The adapter transforms any of the above-mentioned supporting structures into a substantially vertical member possessing keyhole slots for acceptance of the mount of this invention.

What is claimed is:

1. A support for mounting a splicing tool and holder in a substantially horizontally aligned plane on a vertical structure comprising:
   A. a substantially horizontal splicing bar to which the holder and splicing tool are capable of being fixedly attached; and
   B. a mount for securing said splicing bar to said vertical structure comprising:
      1. attachment means for securing said mount to said vertical structure comprising a protruding key capable of securing the mount to a standard keyhole slot support;
      2. clamping means for fixedly securing said horizontal splicing bar; and
      3. stabilizing means for maintaining the mount in a substantially vertical plane.

2. The support of claim 1 wherein said mount further includes and adapter, capable of connecting said mount to a trench spreader or UNISTRUT comprising:
   A. a plurality of keyhole slots for rigid attachment of the mount key;
   B. an adjustable clamp ring for attachment of the adapter to a bar such as a trench spreader; and
   C. a bolt and plate for attachment of the adapter to UNISTRUT.

3. The support of claim 1 wherein said vertical structure is a standard manhole rack.

4. The support of claim 1 wherein said stabilizing means comprises an adjustable bolt passing through the body of the mount below said clamping means and engaging said vertical structure.

5. The support of claim 4 wherein said vertical structure is an adapter.

6. The support of claim 4 wherein said vertical structure is a standard manhole rack.

7. The support of claim 1 wherein said clamping means comprises a bolt passing through the body of said mount and into frictional securing contact with said splicing bar.

8. The support of claim 1 wherein an extension is securely attached to the lower extremity of the mount in order to improve stabilization of said mount.

9. The support of claim 1 wherein said substantially horizontal splicing bar is substantially U-shaped between those portions fixedly attached to said supports.

10. A support for mounting a splicing tool and holder in a substantially horizontally aligned plane on a vertical UNISTRUT member comprising:
   A. a substantially horizontal splicing bar to which the holder and splicing tool are capable of being fixedly attached;
   B. a mount for securing said splicing bar to an adapter, said mount comprising:
      1. a protruding key for securing the mount to a complementary keyhole slot in the adapter;
      2. clamping means for fixedly securing said horizontal splicing bar; and
      3. stabilizing means for maintaining the mount in a substantially vertical plane; and
   C. an adapter capable of connecting the mount to the UNISTRUT member comprising:
      1. a plurality of keyhole slots for rigid attachment of the mount key; and
      2. a bolt and plate for attachment of the adapter to the unistrut member and being capable of securing and maintaining the adapter and attached mount in a substantially vertical plane.

11. A support for mounting a splicing tool and holder in a substantially horizontally aligned plane between substantially horizontal trench spreaders comprising:
   A. a substantially horizontal splicing bar to which the holder and splicing tool are capable of being fixedly attached;
   B. a mount for securing said splicing bar to an adapter, said mount comprising:
      1. a protruding key for securing the mount to a complementary keyhole slot in the adapter;
      2. clamping means for fixedly securing said horizontal splicing bar; and
      3. stabilizing means for maintaining the mount in a substantially vertical plane; and
   C. an adapter capable of connecting the mount to the trench spreader comprising:
      1. a plurality of keyhole slots for rigid attachment of the mount key; and
      2. a clamp ring for attachment of the adapter to the trench spreader and being capable of securing and maintaining the adapter and attached mount in a substantially vertical plane.

* * * * *